United States Patent [19]

Hirayama

[11] Patent Number: 5,493,603
[45] Date of Patent: Feb. 20, 1996

[54] RADIO TELEPHONE SET FOR DIGITAL COMMUNICATION WHICH ALERTS THE USER OF INCOMING DIGITAL DATA SIGNALS

[75] Inventor: Syoji Hirayama, Tokyo, Japan

[73] Assignee: NEC Corporation, Tokyo, Japan

[21] Appl. No.: 100,324

[22] Filed: Aug. 2, 1993

[30] Foreign Application Priority Data

Aug. 5, 1992 [JP] Japan .................. 4-208659

[51] Int. Cl.⁶ ............................ H04Q 7/32
[52] U.S. Cl. ................. 379/58; 379/61; 379/95; 379/100
[58] Field of Search ................. 379/56, 58, 61, 379/95, 100; 455/8, 9, 17

[56] References Cited

U.S. PATENT DOCUMENTS

| | | | |
|---|---|---|---|
| 4,908,851 | 3/1990 | Kotani et al. | 379/100 |
| 5,056,132 | 10/1991 | Coleman et al. | 379/95 |
| 5,247,566 | 9/1993 | Hiramatsu | 379/58 |
| 5,263,078 | 11/1993 | Takahashi et al. | 379/58 |
| 5,282,238 | 1/1994 | Berland | 379/58 |

FOREIGN PATENT DOCUMENTS

| | | | |
|---|---|---|---|
| 0455987 | 11/1991 | European Pat. Off. | 379/100 |
| 4057556 | 2/1992 | Japan | 379/100 |
| 4160855 | 6/1992 | Japan | 379/61 |

*Primary Examiner*—Curtis Kuntz
*Assistant Examiner*—William Cumming
*Attorney, Agent, or Firm*—Young & Thompson

[57] ABSTRACT

In a radio telephone set for digital communication, tone sound is generated under a state where digital data is received. For this purpose, a tone generator is provided to make the tone sound. The tone generator is actuated when a received digital signal is for digital data communication.

3 Claims, 1 Drawing Sheet

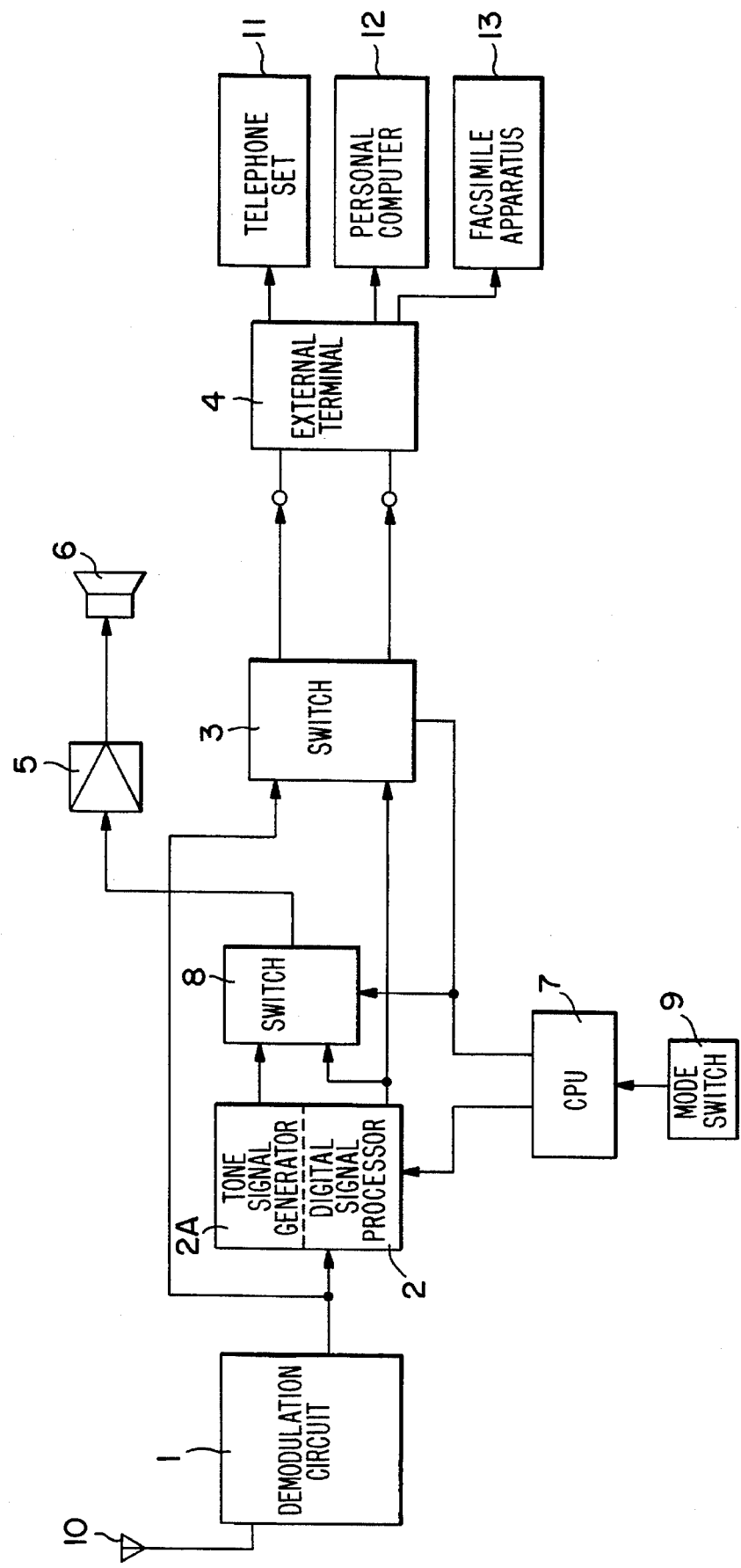

RADIO TELEPHONE SET FOR DIGITAL COMMUNICATION WHICH ALERTS THE USER OF INCOMING DIGITAL DATA SIGNALS

FIELD OF THE INVENTION

The invention relates to a radio telephone set, and more particularly to a radio telephone set indicating digital communication to be presently carried out in non-talking mode.

BACKGROUND OF THE INVENTION

In a conventional radio telephone set, a received digital signal is converted to an analog signal in a codec included therein, when the talking mode is designated by an operator, and the analog signal is supplied to a telephone set circuit which is connected to an external terminal thereof, so that a talking between a caller and a callee is carried out.

On the other hand, when the digital communication mode is designated by the operator, a received digital signal is directly supplied to a personal computer or a facsimile apparatus which is connected to the external terminal without passing through the codec, so that the digital signal is processed in the personal computer or the facsimile apparatus.

In the conventional radio telephone set, however, there is a disadvantage in that a state in case where a digital signal is presently received in the non-talking mode is not externally indicated, for instance, in accordance with audio representation or visual display. Consequently, an operator who wants to make a telephone call can not know the mode state before his call is denied connection to the telephone line.

SUMMARY OF THE INVENTION

Accordingly, it is an object of the invention to provide a radio telephone set for digital communication in which digital data receiving state is externally indicated using an audio representation or a visual display.

It is a further object of the invention to provide a radio telephone set for digital communication in which an operator can know the digital data receiving state before actually trying to make a telephone call.

According to the invention, a radio telephone set for digital communication comprises:

means for providing a demodulated digital signal by receiving a transmitted digital signal, means for generating an analog signal in accordance with the demodulated digital signal, when the demodulated digital signal is for telephone information;

means for generating an indication signal in accordance with the demodulated digital signal, when the demodulated digital signal is for digital data;

means for indicating a state in which the demodulated digital signal for the digital data is received by receiving the indication signal;

a telephone set for carrying out telephone communication by receiving the analog signal; and an external machine for processing the demodulated digital signal for digital data.

BRIEF DESCRIPTION OF THE DRAWINGS

The invention will be explained in more detailed in conjunction with appended drawing, wherein:

FIG. 1 is a block diagram showing a radio telephone set for digital communication in a preferred embodiment according to the invention.

DESCRIPTION OF THE PREFERRED EMBODIMENT

FIG. 1 shows a radio telephone set for digital communication in a preferred embodiment according to the invention which comprises a demodulation circuit 1 for demodulating a digital signal received by an antenna 10, a digital signal processor 2 including a tone signal generator 2A for converting a demodulated digital voice signal into an analog voice signal and for generating a tone signal in the tone signal generator 2A in case where the demodulated digital signal is not for the talking voice, a switch 3 for selecting one of the demodulated digital non-voice signal and the analog voice signal an external terminal 4 to which an external machine such as a telephone set, a personal computer, a facsimile apparatus, etc. is connected, an amplification circuit 5 for amplifying a signal supplied from a switch 8 for selecting one of the tone signal and the analog signal from the digital signal processor 2, a speaker 6 for generating voice or sound in accordance with the signal amplified in the amplification circuit 5, and a central processing unit (CPU) 7 for controlling the digital signal processor 2, the switches 3 and 8, etc. by receiving a mode designating signal supplied from a mode switch 9.

In operation, a digital signal received by the antenna 10 is demodulated in the demodulation circuit 1. When the demodulated digital signal is for voice, the demodulated digital signal is converted to an analog signal in the digital signal processor 2. The analog signal is supplied via the switch 3 to the external terminal 4 and via the switch 8 to the amplification circuit 5 and then to the speaker 6. Thus, an operator can receive voice information by using a telephone set 11 connected to the external terminal 4, while voice or sound is made in accordance with the analog signal amplified in the amplification circuit 5 by the speaker 6.

On the other hand, when the demodulated digital signal is not for voice, the digital signal is supplied via the switch 3 to the external terminal 4, while a tone signal is generated in the tone signal generator 2A of the digital signal processor 2 to be supplied via the switch 8 and the amplification circuit 5 to the speaker. Thus, the digital signal is processed in a personal computer 12 or a facsimile apparatus 13 connected to the external terminal 4, while tone sound is made by the speaker 6. Consequently, the operator can know the digital data receiving state, so that an operator does not attempt to place a telephone call during this state.

In place of or together with the speaker 6, a visual display may be provided to visually indicate the digital data receiving state. In non-digital data receiving state or non-talking state, the operator can select one of digital data transmission mode and telephone mode by using the mode switch 9.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A radio telephone set for digital communication, comprising:

means for receiving a transmitted digital signal, means for demodulating said received digital signal to produce a demodulated digital signal, analog signal generation means for generating an analog signal in accordance with said demodulated digital signal, when said demodulated digital signal contains analog telephone communication;

indication signal generation means for generating an indication signal in accordance with said demodulated digital signal, said indication signal generation means being actuated when said demodulated digital signal is a digital data signal, in order to alert an operator of the radio telephone set of incoming digital data signals;

state indication means for indicating a state in which said digital data signal is received upon reception of said indication signal from said indication signal generation means;

a telephone set for carrying out the analog telephone communication by receiving said analog signal; and at least one external machine for processing said digital data signal.

2. A radio telephone set for digital communication, according to claim 1, wherein:

said indication signal generating means is a tone signal generator for generating a tone signal; and said state indication means is a speaker for making tone sound upon reception of said tone signal.

3. A radio telephone set for digital communication, according to claim 2, wherein:

said analog signal generation means and said tone signal generator are included in a digital signal processor.

* * * * *